US012123102B1

United States Patent
Mazher et al.

(10) Patent No.: US 12,123,102 B1
(45) Date of Patent: Oct. 22, 2024

(54) HIGHLY TEXTURED PEPD TENORITE FILM ON STEEL AND METHOD OF MAKING THE SAME

(71) Applicant: KING FAISAL UNIVERSITY, Al-Ahsa (SA)

(72) Inventors: Javed Mazher, Al-Ahsa (SA); Hesham M. Enshasy, Al-Ahsa (SA); Mohammed H. Alshakhs, Al-Hofuf (SA); Shabina Khan, Bhopal (IN)

(73) Assignee: KING FAISAL UNIVERSITY, Al-Ahsa (SA)

(*) Notice: Subject to any disclaimer, the term of this patent is extended or adjusted under 35 U.S.C. 154(b) by 0 days.

(21) Appl. No.: 18/424,203

(22) Filed: Jan. 26, 2024

(51) Int. Cl.
 *C25D 13/18* (2006.01)
 *C01G 3/02* (2006.01)
 *C25D 13/02* (2006.01)

(52) U.S. Cl.
 CPC .............. *C25D 13/18* (2013.01); *C01G 3/02* (2013.01); *C25D 13/02* (2013.01); *C01P 2004/03* (2013.01)

(58) Field of Classification Search
 None
 See application file for complete search history.

(56) References Cited

U.S. PATENT DOCUMENTS 2,828,254 A * 3/1958 Fahnoe ............... C25D 13/02
 204/491
2012/0234685 A1* 9/2012 Hayashi ............... C25D 13/02
 205/109

FOREIGN PATENT DOCUMENTS

| CN | 111254433 A | 6/2020 |
| DE | 1621504 A1 | 5/1971 |
| GB | 1426855 A | 5/1976 |
| JP | 2613267 B2 | 5/1997 |

OTHER PUBLICATIONS

Jakub Marchewka, Ewa Kołodziejczyk, Patryk Bezkosty & Maciej Sitarz, "Characterization of electrochemical deposition of copper and copper(I) oxide on the carbon nanotubes coated stainless steel substrates", DOI: https://doi.org/10.1038/s41598-023-33963-w.
Teresa D. Golden, Mark G. Shumsky, Yanchun Zhou, Rachel A. VanderWerf, Robert A. Van Leeuwen, and Jay A. Switzer, Electrochemical Deposition of Copper(I) Oxide Films, DOI: https://doi.org/10.1021/cm9602095.
E. Arulkumar, S. Thanikaikarasan, and Nega Tesfie, Influence of Deposition Parameters for Cu2O and CuO Thin Films by Electrodeposition Technique: A Short Review, DOI : https://doi.org/10.1155/2023/8987633.

* cited by examiner

*Primary Examiner* — Louis J Rufo
(74) *Attorney, Agent, or Firm* — Nath, Goldberg & Meyer; Joshua B. Goldberg

(57) ABSTRACT

A method of forming a highly textured tenorite film includes providing a substrate in a pulsed electrophoretic deposition (PEPD) reactor. Tenorite microcrystals, de-ionized water, hydrogen peroxide and sulfuric acid are mixed in the PEPD reactor. A temperature of the PEPD reactor is adjusted to 2-15° C. The highly textured tenorite film is formed on the substrate by electrophoresis having electrophoretic parameters. The electrophoretic parameters include a pulse ON time having a duration of 10 ms to 500 ms, a pulse duty cycle having a range of 0.1 to 0.23, a pulse height having a range of 0.1 to 0.8 kilovolts, and a deposition time having a range of 70 minutes to 2.5 hours.

7 Claims, 6 Drawing Sheets

HIGHLY TEXTURED PEPD TENORITE FILM ON STEEL AND METHOD OF MAKING THE SAME

BACKGROUND

1. Field

The present disclosure relates to a tenorite film on a steel substrate, in particular a highly textured tenorite film on a steel substrate. The present disclosure is also related to a method of making a textured tenorite film on a steel substrate using pulse electrophoretic deposition.

2. Description of the Related Art

Tenorite is an important technological transition metal oxide with numerous applications in electronics. Tenorite, due to its semiconductive properties, is widely used as a junction rectifying layer in switching devices, photodiodes, power electronics, solar-cell photovoltaics, and other sensors. Recently, textured tenorite films have also been employed as electrodes for photocatalytic reduction of environmental pollutants, hydrogen generation, chemical catalysis, energy storage systems, lithium ion batteries, removal or transformation of pollutants from water or soil, environmental remediation, and other applications.

Thus, there is a need for textured tenorite films and alternative methods for making the same.

SUMMARY

The present subject matter is directed to a method of forming a highly textured tenorite film including providing a substrate in a pulsed electrophoretic deposition (PEPD) reactor. Tenorite microcrystals, de-ionized water, hydrogen peroxide and sulfuric acid are mixed in the PEPD reactor. A temperature of the PEPD reactor is adjusted to 2-15° C. The highly textured tenorite film is formed on the substrate by electrophoresis having electrophoretic parameters. The electrophoretic parameters include a pulse ON time having a duration of 10 ms to 500 ms, a pulse duty cycle having a range of 0.1 to 0.23, a pulse height having a range of 0.1 to 0.8 kilovolts, and a deposition time having a range of 70 minutes to 2.5 hours.

In an embodiment, the substrate is a steel substrate.

In another embodiment, the pulse ON time has a duration of 200 ms.

In a further embodiment, the pulse height is 0.2 kilovolts.

In a still further embodiment, the deposition time is 2.0 hours.

In an alternative embodiment, the pulse ON time has a duration of 200 ms, the pulse height is 0.2 kilovolts, and the deposition time is 2.0 hours.

The present subject matter is also directed to the highly textured tenorite films formed by the methods described herein.

DETAILED DESCRIPTION OF THE PREFERRED EMBODIMENTS

Figure 1:
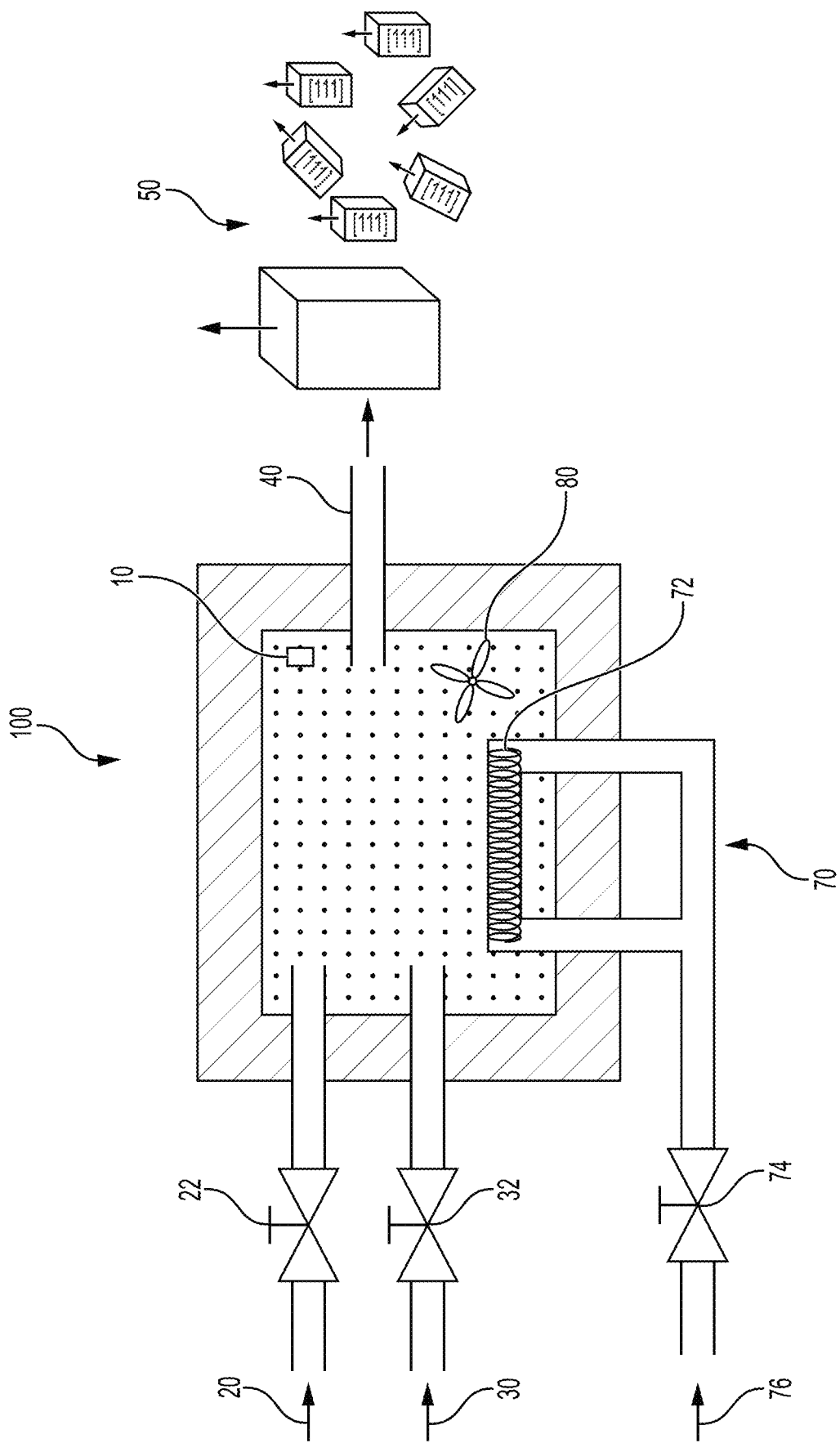
FIG. 1 shows an embodiment of a wet chemical bath reactor usable in the method of the present subject matter.

Throughout the present disclosure, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise. The use of the terms "include," "includes", "including," "have," "has," or "having" should be generally understood as open-ended and non-limiting unless specifically stated otherwise.

Tenorite is a copper oxide mineral with the simple formula CuO. When formed naturally, tenorite is found as a black mineral found in copper deposits and consists of copper oxide in the form of either metallic scales or earthy masses. In some instances, tenorite occurs in the weathered or oxidized zone associated with deeper primary copper sulfide orebodies. Tenorite can also be manufactured under controlled conditions.

Textured tenorite films are desirable for their semiconductive properties. Highly textured tenorite films are a more desirable form owing to the high texturing enhancing the films functional properties. Properties that are enhanced by highly texturing the film include electrical conductivity, optical absorption, and mechanical strength. The enhanced properties lead to better overall performance of the highly textured tenorite films.

Another advantage of high texturing of tenorite films includes greater efficiency of optoelectronic devices by improving light extraction and absorption. In addition, highly textured tenorite films show improved adhesion to substrates by increasing the film stability and durability. High texturing also controls the film anisotropic properties, surface roughness, hydrophobicity and selective sensing.

The present disclosure is directed to a method of making highly textured tenorite films using pulsed electrophoretic deposition (PEPD) on steel substrates. The higher texture is in relation to a preferred grain orientation of tenorite microcrystallites along [111]-crystallographic-axis and coinciding with the tenorite growth (c-axis) plane.

In particular, the present disclosure relates to an optimized pulse height and pulse duty cycle for maintaining high texture of tenorite in pulsed electrophoretic (PEP) deposition. Also optimized is the thermal management of the PEP bath reactor and adequate electrolytic gaseous evolution ($H_2$) from the steel substrate.

The present subject matter is directed to a highly textured tenorite film formed on a substrate. In a particular embodiment, the tenorite used in creating the highly textured film is made by a process in a chemical bath reactor. The tenorite is then used in a PEPD process that produces the highly textured tenorite film. While the present subject matter contemplates making tenorite according to the disclosed method, other sources of tenorite can also be used for making the highly textured tenorite film. The use of tenorite made according to the disclosed process ensures tenorite with the proper crystalline structure for creating the highly textured tenorite film in the second part of the disclosed method.

In a non-limiting embodiment of a first part of the presently disclosed method, tenorite is made by a process in a chemical bath reactor. According to this method, tenorite (or CuO) is made according to the following reactions:

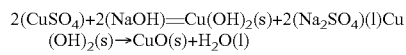

The reactions forming the tenorite in this method take place in a wet bath reaction chamber that was specifically developed for this subject matter. FIG. 1 depicts wet chemical bath reactor 100. Wet chemical bath reactor 100 has insulation 10 around the outer walls to ensure that the temperature within wet chemical bath reactor 100 is easily controlled by temperature controller 60. In addition, wet chemical bath reactor 100 has vessel walls covered with thermosetting polycarbonate to handle highly alkaline solutions needed for the reactions forming the tenorite microcrystals 50.

Wet chemical bath reactor 100 includes liquid inlet 20 having valve 22 to control the in-flow of liquid reactants into the reactor, as well as gas inlet 30 having valve 32 to control the in-flow of gaseous reactants into the reactor. Following the reactions to form the tenorite, the products (tenorite microcrystals as well as the other reaction products) flow out of the wet chemical bath reactor 100 through product outlet 40, where the tenorite microcrystals 50 are harvested.

Wet chemical bath reactor 100 also includes mixing means 80 that is employed to ensure proper mixing during the method. Various different types of mixing means can be used, individually or in combination. Non-limiting examples of mixing means include a digital stirrer which has operating speeds up to 2000 rpm. Also contemplated is a digital adjustable sonication dispenser machine operating with a power range of 50-500 watts.

In addition, wet chemical bath reactor 100 includes heat exchanger 70 that is in conjunction with a water chiller and heater to help control the temperature within the reactor during operation. Heat exchanger 70 includes coil 72 and coolant 76, which can be water or any other suitable coolant material. The flow of coolant 76 is controlled by valve 74. Heat exchanger 70 has an operational temperature in the range of 2-120° C.

In a non-limiting embodiment of the present subject matter, tenorite microcrystals 50 are prepared according to the following method. Copper sulphate pentahydrate, $CuSO_4 \cdot 5H_2O$ (also called Blue Vitriol) is added to the wet chemical bath reactor. While copper sulphate is used in the present embodiment, other hydrated salts of copper could also be used, including without limitation, Cupric chloride (Copper dichloride dihydrate), cupric acetate (copper (II) acetate dihydrate), Copper (II) nitrate trihydrate, and/or Copper (II) nitrate hexahydrate. In a particular embodiment of the present subject matter, the concentration of blue vitriol is optimized in the reactor by keeping the molarity of Cu ions fixed in the range of 0.2 to 1.3.

A nitrogen atmosphere is created in the wet chemical bath reactor by flowing nitrogen gas of high purity (above 99.998% by weight $N_2$ gas). It was determined that the optimal flow rate of nitrogen gas is 0.01-0.2 liter/minute. Following that, sodium hydroxide in the form of caustic soda is charged in the reactor. Alternatively, ammonia gas can be introduced in the reactor at a higher flow rate of 1-10 g/minute during the initial 10 minutes. Other caustic materials usable in this method include potassium hydroxide, liquid ammonia, calcium hydroxide, and/or sodium carbonate. In a particular embodiment, the concentration of sodium ions is optimized to be a molarity kept in the range of 1.0 to 2.4 in the reactor.

Also included in the reactor is aqueous alkaline media. Aqueous alkaline media is a solvent medium used to form the reaction matrix in the reactor. The aqueous alkaline media is prepared by mixing a polar solvent (water) with the caustic agents. The media is highly alkaline in nature and is used during the growth of the tenorite microcrystals in the reactor.

An important consideration for the aqueous alkaline media is the higher dissolvability of metal salts or the reactants used in the process. A highly polar solvent is a medium capable of dissociating other polar and ionic compounds such as the blue vitriol which is used in the process. Water has a high polarity (net dipole moment of water is known to be 1.85 Debye units) and thus mixing a polar ionic solute (salt) in water (solvent) triggers a dominant intermolecular interaction involving dipole-dipole forces resulting in the hydrogen bonding and solute dissociation and that increases the solubility of media. In addition, the alkaline nature of the aqueous media is required for the precipitation of the metal hydroxides. The process reactions involve precipitation of $Cu(OH)_2$ which requires a highly alkaline environment.

In preparing the tenorite microcrystals according to this method, it was determined that the reactor pH value is optimized in the range of 10.5 to 13.2. Much of the basic nature of the reactor environment is the result of the caustic nature of the reactants. Further, the rate of reactor heating and duration are optimized keeping lower the rate in the first 10 minutes in range of 1° C./min to 5° C./min. And using rapid heating fixed rate in the later duration in range of 5° C./min to 15° C./min. Likewise, the wet bath reactor final temperature is optimized in the range of 70° C. to 120° C., with a particular temperature range being 75-85° C.

Given the above conditions, tenorite microcrystals grow in the wet bath reaction chamber. The size of the microcrystals is based on the growth duration, meaning how long the reactions are given to occur. It was determined that growth duration is optimized in the wet chemical bath reactor chamber from 30 minutes to 2 hours. The desired duration depends on the thickness dependent applications of the tenorite/steel electrode. For electrochemical applications such as batteries, hydrogen generation, fuel cell, etc., deposition time of 2 hours is needed to increase the surface energy density and efficiency. On the other hand, if the tenorite layer acts only as a protective layer on steel or in semiconductor applications, then a duration of 30 minutes is sufficient.

Once the tenorite microcrystals reach the desired size, they are harvested. The microcrystals are simply harvested in liquid form following a three-times precipitate washing in the reactor itself using de-ionized pure water. Following that washing, the microcrystals (in liquified form) are extracted from the reactor and can be stored in glass bottles for later use. Alternatively, the crystal fluid can be sonicated after the washing and transferred directly to the PEP reactor used to form the highly textured tenorite film, as described below.

Figure 2:
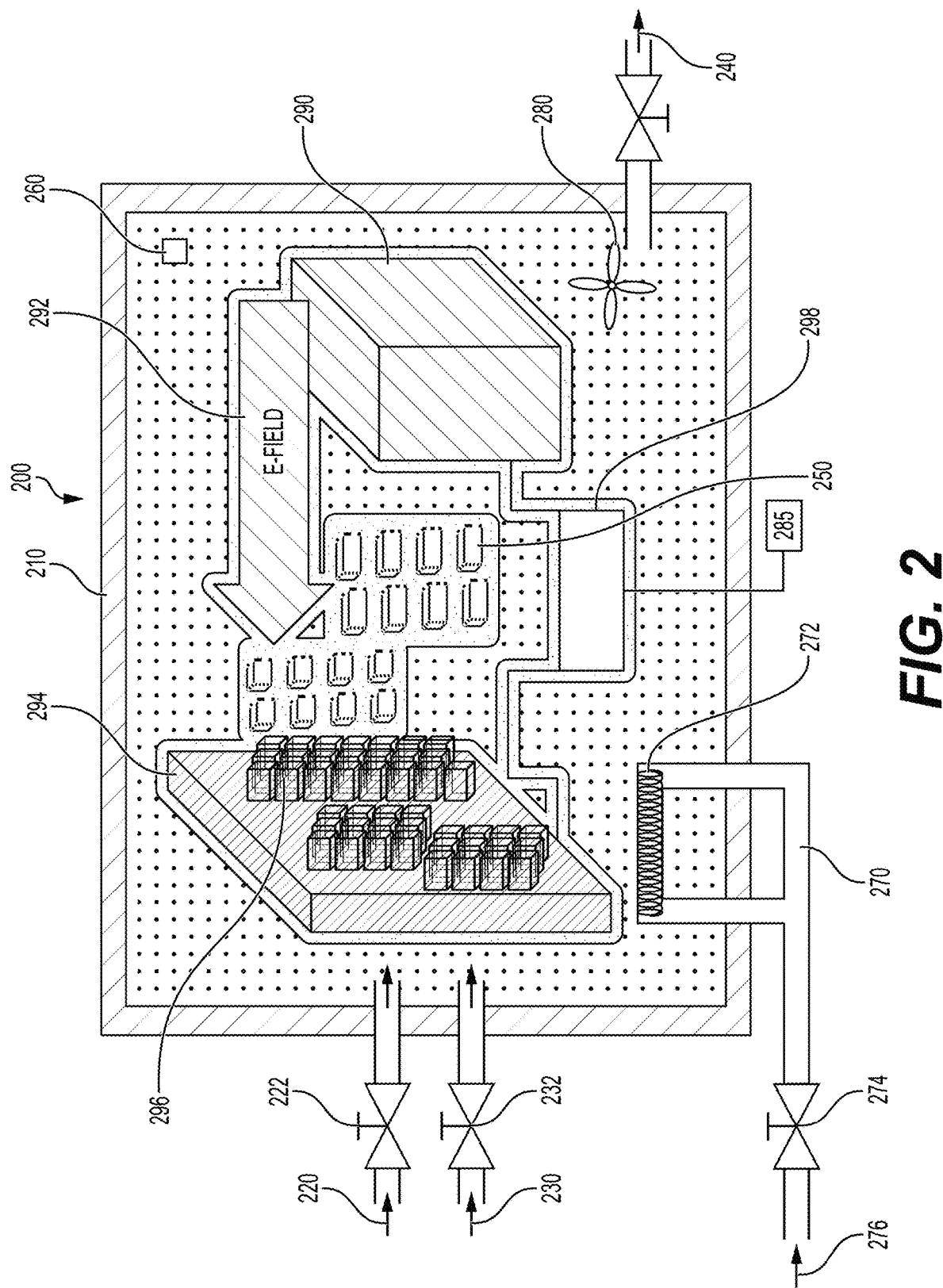
FIG. 2 shows an embodiment of a PEPD reactor usable in the method of the present subject matter.

The present subject matter is also directed to forming highly textured tenorite films on a substrate. In a particular embodiment, the highly textured tenorite film is formed in a pulsed electrophoretic deposition (PEPD) reactor that was specifically developed to accomplish the present method. FIG. 2 depicts PEPD reactor 200. PEPD reactor 200 has insulation 210 around the outer walls to ensure that the temperature within PEPD reactor 200 is easily controlled by temperature controller 260. In addition, PEPD reactor 200 has vessel walls covered with thermosetting polycarbonate to handle highly alkaline solutions needed for the reactions forming the highly textured tenorite film 296.

PEPD reactor 200 includes liquid inlet 220 having valve 222 to control the in-flow of liquid reactants into the reactor, as well as gas inlet 230 having valve 232 to control the in-flow of gaseous reactants into the reactor. Following the reactions to form the tenorite film 296, the expended reactants and byproducts flow out of the PEPD reactor 200 through outlet 240, which can include a valve to help control material flow.

PEPD reactor 200 also includes mixing means 280 that is employed to ensure proper mixing during the method. Various different types of mixing means can be used, individually or in combination. Non-limiting examples of mixing means include a digital stirrer which has operating speeds up to 2000 rpm. Also contemplated is a digital adjustable sonication dispenser machine operating with a power range of 50-500 watts.

In addition, PEPD reactor 200 includes heat exchanger 270 that is in conjunction with a water chiller and heater to help control the temperature within the reactor during operation. Heat exchanger 270 includes coil 272 and coolant 276, which can be water or any other suitable coolant material. The flow of coolant 276 is controlled by valve 274. Heat exchanger 70 has an operational temperature in the range of 2-120° C.

As can be seen in FIG. 2, tenorite microcrystals 250 are deposited on substrate 294 to form tenorite film 296. In a particular embodiment, substrate 294 is a steel substrate. The tenorite microcrystals 250 are deposited on the substrate 294 through the electrical field 292 created the power supply 298 supplying power to the counter electrode 290. Power supply 298 is a computer-controlled high voltage (±1000 volt) and high current power (±30 A) supply. Controller 285 is programmed to control the pulse supply, thereby ensuring the correct pulse height, pulse ON time, number of pulses, and the pulse duty cycle for proper PEPD tenorite film growth 296 on substrate 294.

In an embodiment of the present subject matter, the highly textured tenorite film 296 is deposited on substrate 294 in accordance with the following method. An aqueous dispersion of tenorite microcrystals 250 is added to PEPD reactor 200. Hydrogen peroxide ($H_2O_2$) is added to the tenorite microcrystals. The hydrogen peroxide has a concentration in the range of 7.5-21.5 grams/liter. Next, sulfuric acid at an optimized concentration of 10-20 g/liter is added to create an acidic environment of aqueous acidic media. In an alternative embodiment, sulfur trioxide gas at a fixed flow rate can be flowed during the first 10 minutes in place of the sulfuric acid.

One of the characteristic properties of the aqueous acidic media is to change the color of blue litmus paper red. Solvent polarity is fixed since the DI water is used as aqueous medium and net dipole moment of water is fixed at 1.85 Debye units. A solvent such as water mixed with a small amount of sulfuric acid is excellent example of the aqueous acidic media. However, in the process adopted in the present subject matter, the sulfuric acid is added directly in small quantities in the tenorite microcrystal fluid (as described above) until the pH optimization is obtained. The tenorite phase of the microcrystals is highly dependent on the pH of the PEPD reactor. High acidic character lower than 4.5 pH may result in the deterioration of the very phase itself. High basic character above 9 pH changes the surface charge characteristic of the microcrystals rendering them not useful for depositing on the working electrode (steel substrate) due to the change in electric nature of surface charges. Thus, during the pH selection, phase purity and film formation are important considerations. Optimized pH value lies in between 6.1 to 6.6 pH values.

In addition, solvent polarity is important for the formation of surface charge layers on the tenorite microcrystal surface. The formation of double layers of electric charges, proton and oxygen layers, takes place due to hydrogen bonding (proton layer) on the tenorite surface and their electrical screening by oxygen layer. The thickness of surface charge layer is directly proportional to the dipole moment of water; it is well known that water has one of the highest dipole moment and dielectric constant among various solvents. During the PEP deposition, the thicker double layer on tenorite helps in maintaining parallel alignment of crystallite's 111 growth axis with that of the applied pulsed electric field's direction, as shown in FIG. 2.

After charging the PEPD reactor with tenorite microcrystals, hydrogen peroxide, and sulfuric acid, the mixture is mixed for up to 30 minutes using the mixing means. In a particular embodiment, the mixing is in the form of sonification for 30 minutes. The temperature of the PEPD reactor is adjusted in between the range of 2-15° C. using the heat exchanger attached to chamber. In a particular embodiment, the temperature is held at 8° C., at which the substrate heating is found minimal along with the moderately higher growth rate of the film. Low growth temperature slows down the growth rate, while a high growth temperature negatively affects the texture and film uniformity due to substrate heating.

In order to obtain a highly textured tenorite film, the electrophoretic pulse parameters are optimized. The controller 285 is programmed to change the various electrophoretic pulse parameters, including pulse height, pulse duration, pulse ON time duty cycle of pulse, shape of pulse waveform, the number of applied pulses and the total duration of the film deposition. The following were found to be optimal parameters for forming the highly textured tenorite film: a pulse ON time having a duration of 10 ms to 500 ms; a pulse duty cycle in the range of 0.1 to 0.23; a pulse height in the range of 0.1 kilovolt to 0.8 kilovolt; and a deposition time in the range from 70 minutes to 2.5 hours. In a particular embodiment, the pulse ON time has a duration of 200 ms. In an alternative embodiment, the pulse height is 0.2 kilovolt. In a further alternative embodiment, the deposition time is 2.0 hours.

Figure 3:
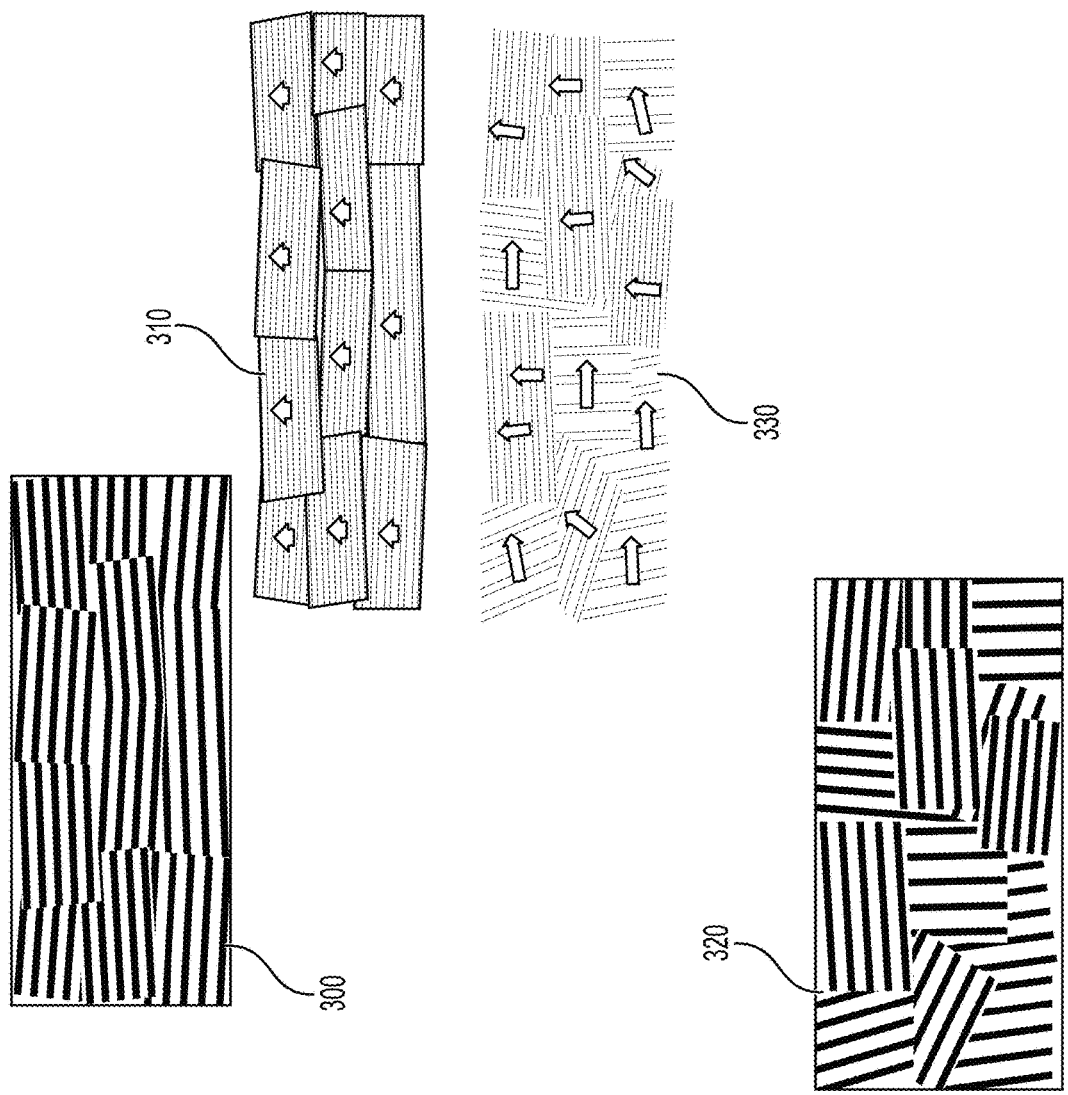
FIG. 3 depicts the plane orientation and grain orientation of tenorite films formed with and without parameter optimization according to an embodiment of the present subject matter.

In an embodiment, the present disclosure is directed to a highly textured tenorite film formed on a steel substrate. The term "highly textured" as used herein refers to the ordered orientation of the tenorite microcrystals when the film is formed on the substrate. FIG. 3 illustrates the concept of the highly textured nature of the tenorite film being formed. In FIG. 3, highly textured PEPD tenorite film 300 is shown after optimization of the various electrophoretic parameters as described above. As can be seen with film 300, the [111] planes of the tenorite microcrystals are stacked in an orderly manner. Likewise, film 310 shows the ordered [111] planes in the stacked manner, with the arrows representing the direction of the grain orientation for the tenorite microcrystals. Thus, it can be seen with film representations 300 and 310 that the highly textured tenorite film created by the optimized parameters has ordered planes and grain orientation.

On the other hand, films 320 and 330 depict tenorite films that are not highly textured, or are untextured. Film 320 shows the [111] planes of the tenorite microcrystals when the electrophoretic parameters are not optimized as done herein. As can be seen, the [111] planes are in a random orientation. This randomness is also shown in film 330 where the arrows show the different grain orientations. Therefore, it is easy to see the difference between the highly textured tenorite films 300, 301 as compared to the untextured tenorite films 320, 330.

Figure 4A:
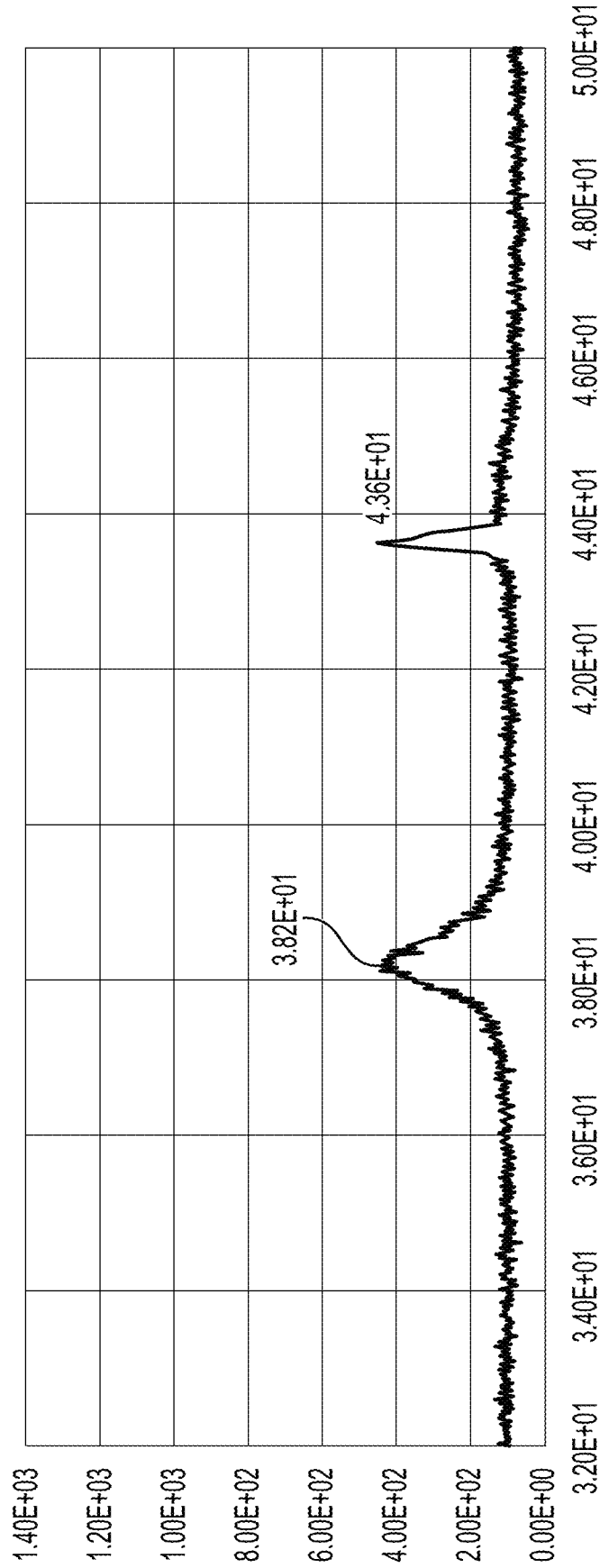
FIG. 4A shows x-ray diffraction analysis if a steel substrate with a highly textured tenorite film in accordance with the present subject matter.
Figure 4B:
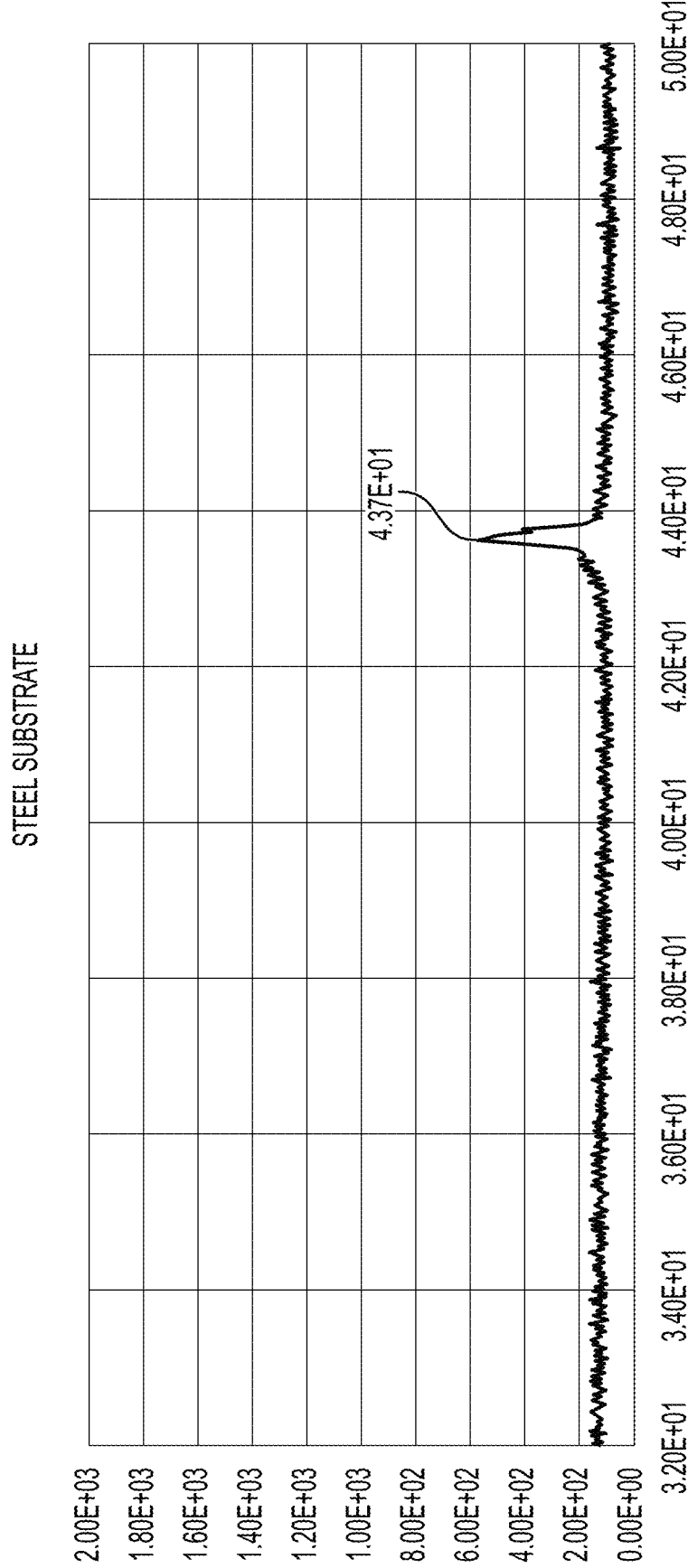
FIG. 4B shows x-ray diffraction analysis if a steel substrate without a highly textured tenorite film in accordance with the present subject matter.
Figure 5:
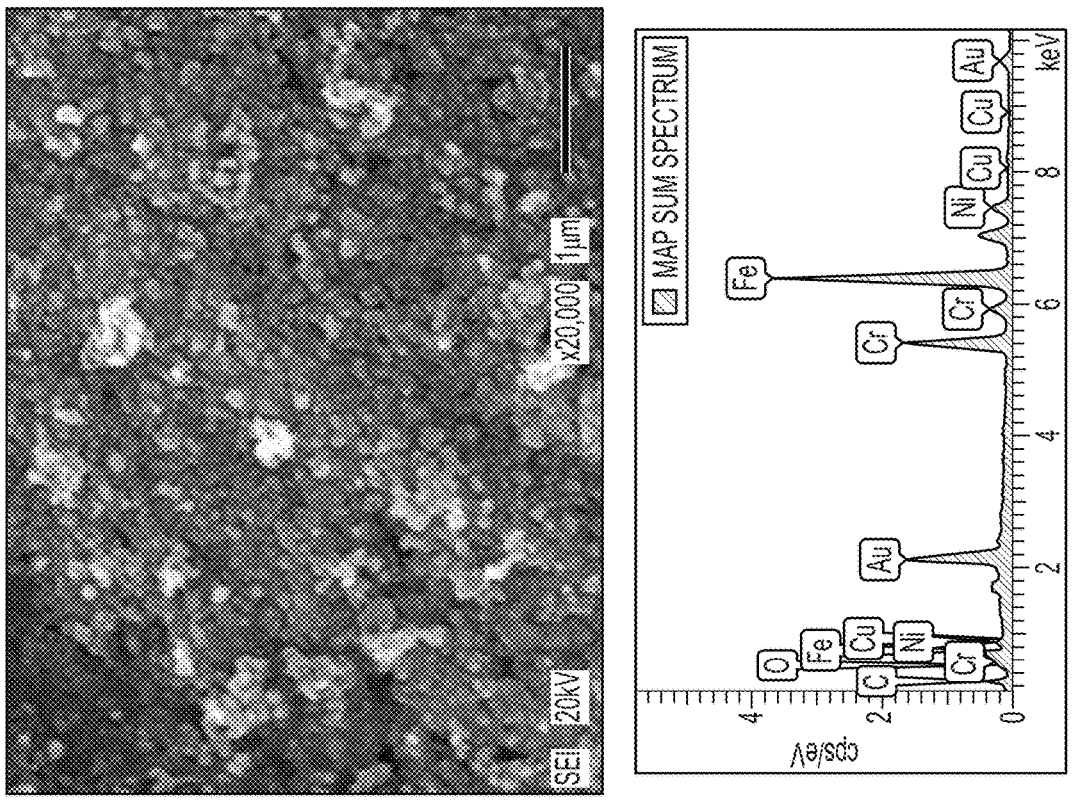
FIG. 5 shows morphology (scanning electron microscope) and compositional analysis of a highly textured tenorite film in accordance with the present subject matter.
Figure 5:
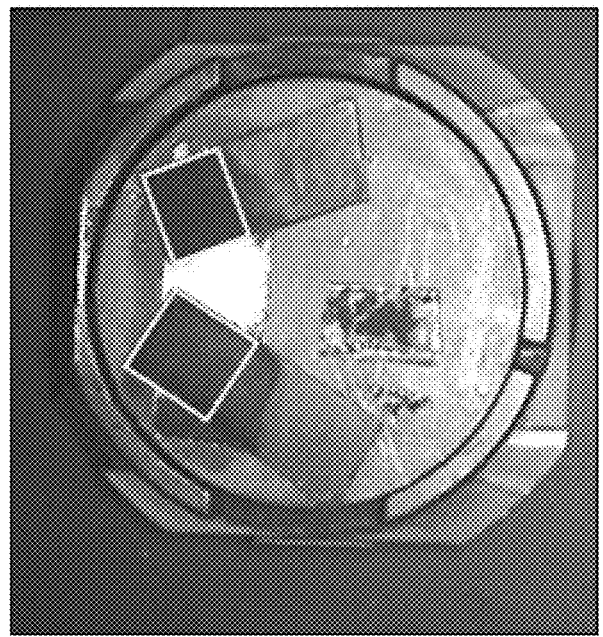

A highly textured tenorite film was deposited on a steel substrate in accordance using the optimized parameters discussed herein. FIGS. 4A-4B shows x-ray diffraction results of the pure steel substrate as compared to x-ray diffraction results of the highly textured tenorite film on the steel substrate. Furthermore, FIG. 5 shows the morphology of the highly textured tenorite film, as well as the compositional analysis of the film.

It is to be understood that the present subject matter is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of forming a highly textured tenorite film comprising:
    providing a substrate in a pulsed electrophoretic deposition (PEPD) reactor;
    mixing tenorite microcrystals, de-ionized water, hydrogen peroxide and sulfuric acid in the PEPD reactor;
    adjusting a temperature of the PEPD reactor to 2-15° C.;
    forming the highly textured tenorite film on the substrate by electrophoresis having electrophoretic parameters,
    wherein the electrophoretic parameters comprise a pulse ON time having a duration of 10 ms to 500 ms, a pulse duty cycle having a range of 0.1 to 0.23, a pulse height having a range of 0.1 to 0.8 kilovolts, and a deposition time having a range of 70 minutes to 2.5 hours.

2. The method of forming a highly textured tenorite film according to claim 1, wherein the substrate is a steel substrate.

3. The method of forming a highly textured tenorite film according to claim 1, wherein the pulse ON time has a duration of 200 ms.

4. The method of forming a highly textured tenorite film according to claim 1, wherein the pulse height is 0.2 kilovolts.

5. The method of forming a highly textured tenorite film according to claim 1, wherein the deposition time is 2.0 hours.

6. The method of forming a highly textured tenorite film according to claim 1, wherein the pulse ON time has a duration of 200 ms, the pulse height is 0.2 kilovolts, and the deposition time is 2.0 hours.

7. The method of forming a highly textured tenorite film according to claim 1, wherein the PEPD reactor comprises a controller configured to control the electrophoretic parameters.

* * * * *